(12) United States Patent
Pijanowski et al.

(10) Patent No.: US 7,422,103 B2
(45) Date of Patent: Sep. 9, 2008

(54) APPARATUS FOR HOLDING A COMPACT DISK

(75) Inventors: Stefan Alexander Pijanowski, Oundle (GB); Anthony Henry Joseph Fraser, Ketton (GB); Peter Antony Farrar, Menston (GB)

(73) Assignee: Meadwestvaco Corporation, Glen Allen, VA (US)

( * ) Notice: Subject to any disclaimer, the term of this patent is extended or adjusted under 35 U.S.C. 154(b) by 0 days.

(21) Appl. No.: 11/464,548

(22) Filed: Aug. 15, 2006

(65) Prior Publication Data
US 2007/0114146 A1 May 24, 2007

Related U.S. Application Data (63) Continuation of application No. 10/137,372, filed on May 3, 2002, now Pat. No. 7,143,894, which is a continuation of application No. 09/180,073, filed on Sep. 14, 1999, now Pat. No. 6,502,694, which is a continuation-in-part of application No. 08/817,897, filed as application No. PCT/GB95/02581 on Nov. 3, 1995, now Pat. No. 5,788,068.

(51) Int. Cl.
*B65D 85/57* (2006.01)
(52) U.S. Cl. .................................... 206/308.1; 206/310
(58) Field of Classification Search ................. 206/232, 206/307, 308.1, 309, 312, 493, 310
See application file for complete search history.

(56) References Cited

U.S. PATENT DOCUMENTS

| | | | |
|---|---|---|---|
| 3,949,872 A | 4/1976 | Paudras | |
| D260,122 S | 8/1981 | Turner | |
| 4,702,369 A | 10/1987 | Philosophe | |
| 4,793,477 A | 12/1988 | Manning et al. | |
| 4,793,479 A * | 12/1988 | Otsuka et al. | ............ 206/308.1 |
| 4,819,799 A | 4/1989 | Nomula et al. | |
| D304,880 S | 12/1989 | Philosophe | |
| 4,895,252 A * | 1/1990 | Nomula et al. | ........... 206/308.1 |
| 5,011,010 A | 4/1991 | Francis et al. | |

(Continued)

FOREIGN PATENT DOCUMENTS

EP 0 356 539 A1 * 7/1990

(Continued)

*Primary Examiner*—David T Fidei (57) ABSTRACT

The apparatus comprises a base portion (2) and at least two arms (1) resiliently cantilevered from the base portion (2), the inner ends of the arms (1) forming a button-like member (4) and each having a projection (4A) for engaging on the outwardly facing surface of a compact disk (10) held on the apparatus. Depression of the button-like member (4) causes the projections (4A) to move towards each other until their engagement on the disk (10) is released. An upstand (6) surrounds the disk (10) and is positioned close thereto so as to restrict movement of the disk (10) within its own plane. The inner ends (4) of the arms (1) may be shaped to reduce the risk of forces applied thereto in the plane of the disk (10) causing the disk (10) to be released. Finger recesses (6A) in the upstand may be formed so as to inhibit access to the edge of a disk (10) whilst held by the apparatus but provide access thereto once the disk (10) has been released. 3-arm release mechanisms are also described.

6 Claims, 10 Drawing Sheets

U.S. PATENT DOCUMENTS

| | | |
|---|---|---|
| 5,101,971 A | 4/1992 | Grobecker |
| 5,168,991 A | 12/1992 | Whitehead et al. |
| 5,238,107 A | 8/1993 | Kownacki |
| 5,251,750 A | 10/1993 | Gelardi et al. |
| 5,259,498 A | 11/1993 | Weisburn et al. |
| 5,285,893 A | 2/1994 | Misterka et al. |
| D347,320 S | 5/1994 | DuCorday |
| 5,310,053 A | 5/1994 | Lowry et al. |
| D347,727 S | 6/1994 | DuCorday |
| 5,322,162 A | 6/1994 | Melk |
| 5,341,924 A | 8/1994 | Morrone |
| D351,963 S | 11/1994 | Lim |
| 5,377,825 A | 1/1995 | Sykes et al. |
| 5,417,324 A | 5/1995 | Joyce et al. |
| 5,529,182 A | 6/1996 | Anderson et al. |
| D371,482 S | 7/1996 | Cole, Sr. |
| 5,593,030 A | 1/1997 | Tell |
| 5,630,504 A | 5/1997 | Fitzsimmons et al. |
| 5,788,068 A * | 8/1998 | Fraser et al. ............ 206/310 |
| 6,502,694 B1 * | 1/2003 | Pijanowski et al. ....... 206/310 |
| 7,143,894 B2 * | 12/2006 | Pijanowski et al. ....... 206/310 |

FOREIGN PATENT DOCUMENTS

| | | |
|---|---|---|
| EP | 0414306 A1 | 2/1991 |
| JP | 402205589 A | 8/1990 |
| JP | 406122491 A | 5/1994 |
| JP | 407125785 A | 5/1995 |

* cited by examiner

APPARATUS FOR HOLDING A COMPACT DISK

CROSS-REFERENCE TO RELATED U.S. APPLICATIONS

This application is a continuation of U.S. patent application Ser. No. 10/137,372, filed May 3, 2002, now U.S. Pat. No. 7,143,894, which is a continuation of U.S. patent application Ser. No. 09/180,073, filed on Sep. 14, 1999, now U.S. Pat. No. 6,502,694, which is a continuation-in-part of application Ser. No. 08/817,897, filed as application Ser. No. PCT/GB95/02581 on Nov. 3, 1995, now U.S. Pat. No. 5,788,068.

BACKGROUND OF THE INVENTION

1. Field of the Invention

The present invention relates generally to media packaging, and more particularly to an apparatus for holding a compact disk. "Compact disk" in the context of this specification means not only the relatively common standard 120 mm diameter laser-readable disk such as are currently sold carrying, for example, pre-recorded music, computer software and data, and similar recordable disks, but also similar disks of various sizes such as are known or proposed for recording video, films, interactive games and other information or data.

2. Description of Background Art

Conventionally, when not in use, compact disks are stored in clear polystyrene boxes, known as "jewel cases," wherein the disk is held on a separate insert or tray fitted in the case and having seven or eight tines arranged to form a boss or "rosette" with which the aperture in the center of a compact disk may be releasably engaged.

The legs or tines of the rosette are shaped such that they extend upwardly from the tray, curve outwardly, such that they can grip a compact disk, and then, towards their ends, curve inwardly to provide a boss over which the hole in the compact disk may be manually pushed.

It has long been recognized that such apparatus for holding a compact disk is not very satisfactory as it requires two hands to release a disk and lift it from the rosette. Consequently, many people do not attempt to push the center of the rosette but instead just use one hand to grasp an outer edge of a compact disk and wrench it off the rosette, thereby bending the disk, sometimes scoring the recorded surface of the disk on the tines, and eventually distorting or even breaking the tines. Such apparatus also does not retain the disk securely in that the disk can be released by lifting an edge thereof and may also be released due to shock loads, e.g., during transport, rough handling or if the apparatus is dropped or is subjected to an impact.

GB-A-2291640 and WO 96/14636 disclose apparatus which overcomes many of the disadvantages of the prior art. The disclosures of GB-A-2291640 and WO 96/14636 are hereby incorporated in the present specification. It has been found, however, that the apparatus disclosed in GB-A-2291640 and WO 96/14636 can be further improved and that its construction can be further simplified.

One of the objectives of the present invention is to reduce the risk of accidental release of a disk due to shock loads applied in the plane of a disk. Another objective is to inhibit users from attempting to remove the disk by gripping the edge of the disk without having depressed the release mechanism. In conjunction with the above, another objective is to facilitate easy removal of a disk after the release mechanism has been depressed.

SUMMARY OF THE INVENTION

In accordance with the above and other objectives of the present invention, according to a first aspect of the invention, there is provided an apparatus for holding a compact disk having a central hole, the apparatus comprising: a base portion and disk engaging means extending from the base portion for releasably engaging the central hole of a disk, the disk engaging means comprising at least two arms resiliently cantilevered from the base portion, the inner ends of the arms together forming a button-like member and each being provided with a projection arranged to securely retain a compact disk on the apparatus by engaging on an outwardly facing surface thereof, the arrangement being such that depression of the button-like member depresses the arms so as to move the projections towards each other until their engagement on the outwardly facing surface of the compact disk is released; an upstand being provided to surround or partially surround the peripheral edge of a disk while it is held by the disk engaging means and positioned sufficiently close to the periphery of the disk as to restrict the scope for movement of the disk within its own plane.

According to a second aspect of the invention, there is provided an apparatus for holding a compact disk having a central hole, the apparatus comprising a base portion and two arms resiliently cantilevered from the base portion extending radially inwards towards each other and away from the base portion, the inner end of each arm being provided with a projection and a contact portion, the projections being arranged to securely retain a compact disk on the apparatus by engaging on an outwardly facing surface thereof and the contact portions of the respective arms together forming a button-like member suitable for engagement by a fingertip, the arrangement being such that depression of the button-like member towards the base member causes the projections to move towards each other until their engagement with the outwardly facing surface of the compact disk is released, the contact portions being arranged such that should a force be applied to a disk held by the apparatus substantially in the plane of the disk and substantially perpendicular to the arms, at least the majority of said force is transmitted by the disk to only one of the contact portions so the possibility of such a force acting on the button-like member so as to release the disk is reduced.

According to another aspect of the invention, there is provided an apparatus for holding a compact disk having a central hole, the apparatus comprising a base portion provided with disk engaging means for releasably engaging the central hole of a disk and release means depression of which releases the disk from the disk engaging means whereupon the disk is moved to a raised position further from the base portion, the base portion being provided with an upstand positioned so as to surround or partially surround the periphery of a disk held on the apparatus, recesses or cut-outs being provided in the upstand and being shaped so as to provide access to the edge of the disk when it has been released from the disk-engaging means but prevent or inhibit such access when the disk is held by the disk-engaging means.

According to a further aspect of the invention, there is provided an apparatus for holding a compact disk having a central hole, the apparatus comprising: a base portion; a disk engaging and release mechanism extending from the base portion for releasably engaging the central hole of a disk, comprising three equiangularly spaced arms each resiliently cantilevered from the base portion, the inner ends of the arms together forming a button-like member for releasably engaging the central hole of a disk; and support means in the form of a raised surface extending around the disk engaging means and arranged to support the periphery of a disk mounted on the apparatus during operation of the disk-engaging and release mechanism.

Additional features and advantages of the present invention will become apparent from the following detailed description and accompanying drawings and from the subsidiary claims of the specification.

BRIEF DESCRIPTION OF THE DRAWINGS

The invention will now be further described, merely by way of example, with reference to the accompanying figures, in which.

DETAILED DESCRIPTION

Figure 1:
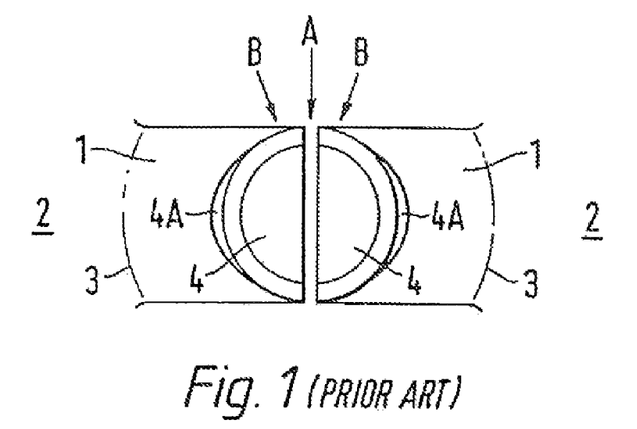
FIG. 1 is a schematic plan view of a known release mechanism as described in GB-A-2291640.

FIG. 1 shows a plan view of two disk engaging arms 1 of prior art such as that disclosed in GB-A-2291640, cantilevered from a base portion 2 and connected thereto at hinge lines 3. The inner end of each arm is provided with a semicircular contact portion 4 which together form a substantially circular button-like member over which the central aperture of a disk (not shown) is fitted. Each contact portion 4 carries a lip or projection 4A for securely retaining a disk by engaging on an outwardly facing surface thereof. The disk is released by depressing the button-like member towards the base portion, which causes the contact portions 4 and hence the projections 4A to move towards each other until the engagement of the projections 4A on the disk is released.

Although this release mechanism functions satisfactorily, it can be improved in a number of ways, particularly to reduce the risk of accidental release of the disk therefrom.

One problem with the apparatus shown in FIG. 1 is that if a force is applied in the plane of the disk in the direction A, i.e. perpendicular to the arms 1, this force causes the disk to engage both contact portions and apply forces to them as illustrated by the arrows B. Such forces tend to push both contact portions 4 inwardly, i.e. towards each other, and downwardly (towards the base portion 2) with the result that the disk can be released. In the example shown in FIG. 1, the gap between the contact portions is relatively small but in real life the gap may be much wider so making this problem worse. This is a significant disadvantage as forces can be applied in the direction A due to mishandling of the disk or shock loads, e.g. if the apparatus is dropped or receives a blow on the side.

It should be noted that references in this specification to forces applied to a disk include not only forces applied directly to the disk but also inertial forces which cause the disk to move in a similar way, e.g. when the apparatus is subjected to an impact.

It has been discovered that one way of reducing the possibility of the disk being released in this way is to arrange the contact portions 4 so that at least the majority of any force applied in the direction A is transmitted by the disk to only one of the contact portions 4.

Figure 2:
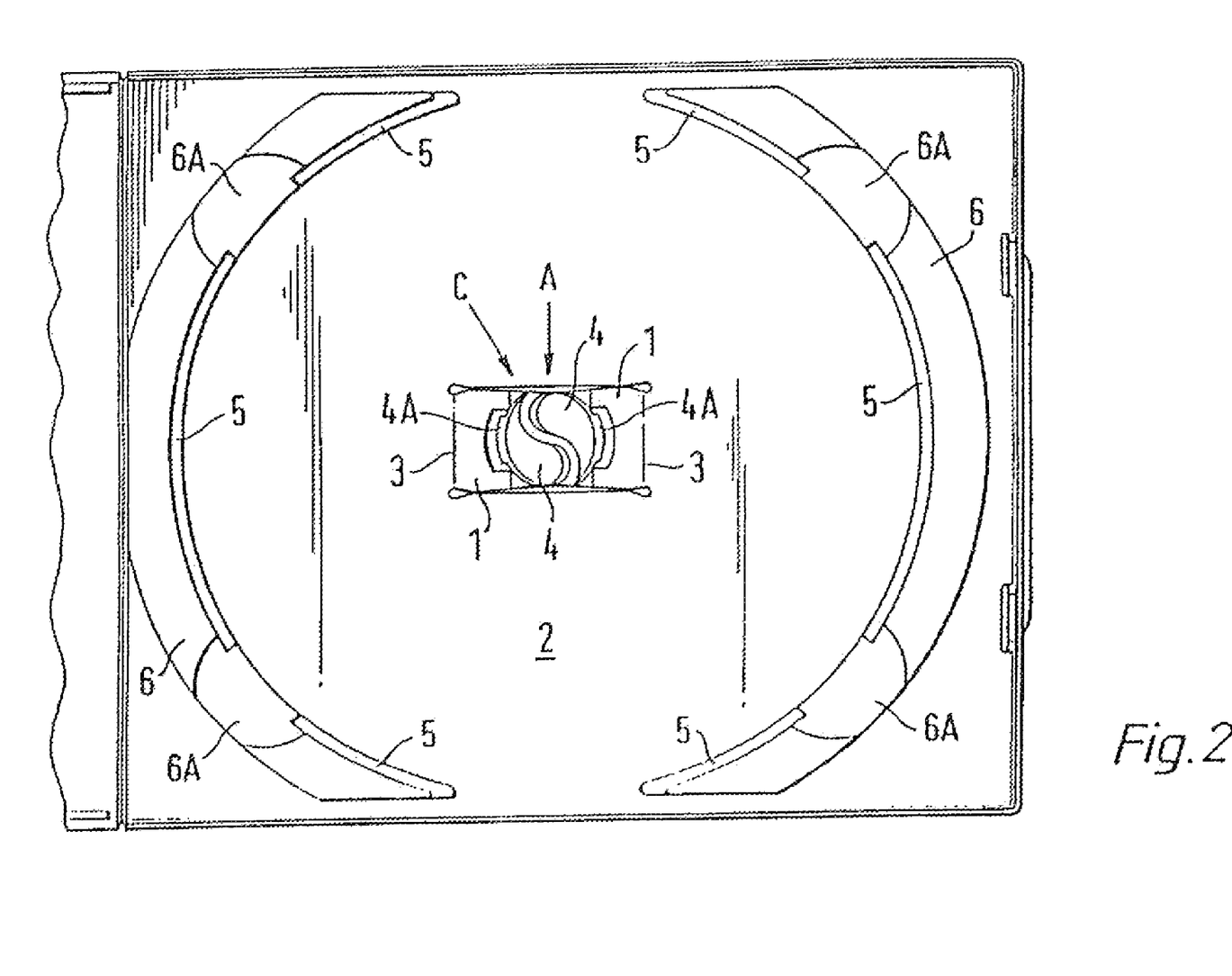
FIG. 2 is a plan view of a first embodiment of the apparatus according to the present invention.

This can be achieved by arranging the contact portions 4 so that the ends of the gap between them lie away from the perpendicular to the length of the arms 1. FIGS. 2 and 4 show various possible shapes of the contact portion 4 which achieve this.

There are a number of reasons why such an arrangement of the contact portions helps reduce the risk of the disk being released by forces applied within the plane of the disk and, in particular, in a direction perpendicular to the length of the arms 1. Firstly, as the force (or at least a majority of the force) A acts on only one of the contact portions, the tendency for the contact portions to be squeezed together is avoided or reduced. Also, as the gap between the contact portions 4 does not lie on this perpendicular, the contact portions can be formed to be a very close fit within the disk aperture in this direction so as to reduce the scope for lateral movement of the disk in this direction to a minimum.

Figure 4A:
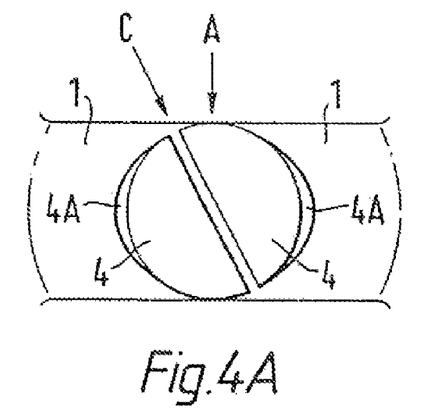
FIGS. 4A-4D are schematic plan views of alternative forms of release mechanisms which may be used in place of that shown in FIG. 2.

Furthermore, if a force is applied in direction C shown in FIG. 4A, i.e. at the end of the gap between the contact portions 4, the tendency for such a force to cause the disk to release compared with a force in direction A acting on the arrangement shown in FIG. 1 is much reduced. Again, there are a number of reasons for this. As the gap between the contact portions is no longer perpendicular to the length of the arms 1, the width of the gap can be reduced as the inward movement of the contact portions 4 when the button-like member is depressed will be in a direction at an angle across the gap. The consequent reduction in the width of the end of the gap where the force C may be applied reduces the pinching effect of such a force as well as reducing the scope for movement of the disk perpendicular to the gap. Furthermore, a force in direction C will have a much reduced tendency to deflect the arm 1 as it is no longer perpendicular to the length of the arm 1. A force in direction C is resisted by the arm 1 as one component of the force is trying to stretch the arm. Furthermore, a force in direction C also acts to hold the disk more tightly under the projection 4A on that side of the button-like member and so the disk is retained more securely rather than having a tendency to be released.

It will be appreciated that the projections 4A are only provided on the side of the contact portion 4 in line with the arms 1 so they move inwardly when the button-like member is depressed to release the disk. For this reason, the prior art arrangement shown in FIG. 1 is particularly vulnerable to a force applied in the direction A as such a force has no component which acts to hold the disk under either of the projections 4A.

Figure 4B:
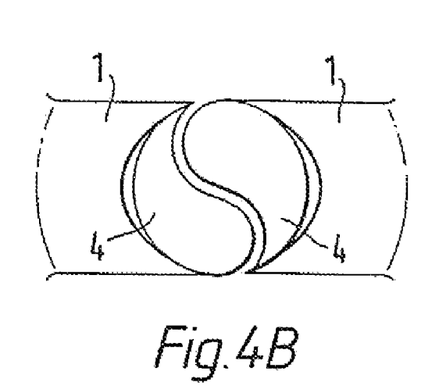

As mentioned above, the contact portions 4A can have a variety of shapes to achieve the above advantages. The gap between the contact portions may be a simple straight line at, for example, approximately 45-70 degrees to the length of the arms 1 as shown in FIG. 4A. Alternatively, the dividing line between the contact portions 4 may have a curved or sinusoidal shape. FIGS. 2 and 4B show examples of the latter where the contact portions 4 have a shape resembling the "yin-yang" symbol. The ends of these dividing lines still lie away from the perpendicular to the length of the arms 1 and are preferably positioned as close as possible to the arms 1.

Figure 4C:
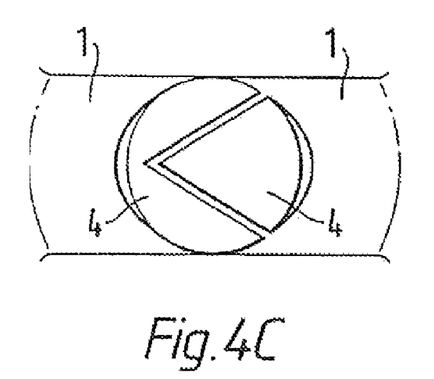
Figure 4D:
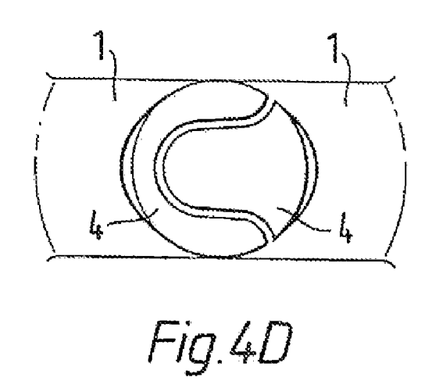

FIG. 4C shows a further arrangement in which the dividing line is substantially V or U-shaped and FIG. 4D shows a further variant of this in which the dividing line follows a more curved form.

The width of the gap between the contact portions 4 is preferably 1.5 mm or less and most preferably 1.0 mm or less.

A further advantage of the arrangements described above is that the contact portions can be arranged to increase the likelihood that both portions are contacted when the button-like member is engaged by a finger tip (and so give more reliable operation of the disk release mechanism). If the diagonal dividing line shown in FIG. 4A is arranged in the orientation shown so that it extends from the top left to the bottom right when a case incorporating the apparatus is open in the orientation shown in FIG. 2, a right-handed person tends to extend their right index finger in a similar direction to this diagonal line so their finger tip will usually bridge the dividing line.

The other shape contact portions 4 shown in FIGS. 2 and 4B-4D are also designed so that, with a typical adult finger, it is difficult to press the button-like member without engaging both contact portions.

A yet further advantage of the arrangements described above, is that the dividing line between the contact portions, particularly in the central region of the button-like member, is no longer perpendicular to the length of the arms 1 so any tendency for a finger pressing the button-like member to be pinched by the gap as the contact portions 4 move towards each other is reduced. It will be appreciated that in the arrangements shown in FIGS. 4C and 4D, the dividing line does not pass across the central region of the button-like member so the possibility of the finger being pinched in this way is further reduced.

In addition to the above features, it is important to accurately form the button-like member so that it is a close fit within the central aperture of the disk (which has a 15 mm diameter in the conventional 120 mm diameter disk) in order to minimize the scope for movement of the disk within the plane of the disk while it is held on the apparatus. To this end, in the direction parallel to the length of the arms 1, the diameter of the button-like member immediately beneath the projection 4A when the disk is held thereon is preferably as close a match as possible to the diameter of the disk's aperture (which is typically 15 mm) so as to avoid or minimize any play therebetween and avoid or minimize any stress applied to the aperture. Preferably the disk is free to rotate on the button-like member although lateral movement of the disk, i.e. within the plane of the disk, on the button is prevented or minimized.

In the direction perpendicular to the length of the arms 1, the contact portions 4 are again sized to be as close a fit as possible within the aperture of the disk so as to avoid or minimize the scope for movement of the disk in this direction and avoid or minimize any stress applied to the aperture.

The projections 4A preferably project from the sides of the contact portions and preferably project therefrom by between 0.5 and 1.0 mm. Each projection also preferably extends around an arc on the edge of the respective contact portion so as to subtend an angle of between 30 and 90 degrees at the centre of apparatus.

The apparatus described herein has a number of other important differences over the apparatus described in GB-A-2291640. GB-A-2291640 describes the use of resilient ejection means for urging the disk out of engagement with the disk engaging means when the rims or lips release their engagement on the disk, for example, further arms resiliently cantilevered from the base portion or one or more pieces of compressible material.

Such resilient ejection means may be used in the apparatus described herein. However, instead of or in addition to such resilient means, it has been discovered that the resilience of other parts of the apparatus, e.g. the arms 1 or the base portion 2, and, in particular, the resilience of the disk itself can be used to provide a similar ejection function. The apparatus is thus preferably arranged so that as the button-like member is depressed to release the disk, part of the apparatus and/or the disk is flexed so that elastic energy is stored therein and, when the engagement of the projections 4A is released, the said part and/or disk reverts to its unstressed state and causes at least the central portion of the disk to move so the projections 4A pass through the central aperture of the disk.

One simple way of achieving this is to provide supports 5 adjacent the periphery of the disk so that when the button-like member is depressed, the disk is moved towards the base portion 2 until its periphery engages the supports 5. Further depression of the button-like member to release the disk thus presses the center of the disk towards the base portion 2 relative to the periphery of the disk whereby the disk undergoes elastic deformation. Once the projections 4A have moved inwardly sufficient to release their engagement on the outwardly facing surface of the disk, the disk is free to revert to its unstressed, flat shape whereupon the central portion of the disk moves, or "pops up," so it is not re-engaged by the projections 4A or button-like member when the user's finger is removed.

In the embodiment shown in FIG. 2, support is provided at the periphery of the disk by raised surfaces 5 formed on the base portion 2.

The arrangement is preferably such that when a disk is held in the apparatus, the arms 2 support the disk clear of the support 5. The disk is thus held in an unstressed state and is free to rotate on the button-like member. Alternatively, the arrangement may be such that when a disk is held in the apparatus, the periphery of the disk is or is almost in contact with the support 5. It is also possible for the arrangement to be such that when a disk is installed on the apparatus it is held in a slightly flexed state and reverts to a flat shape when its engagement with the projections 4A is released.

Figure 3:
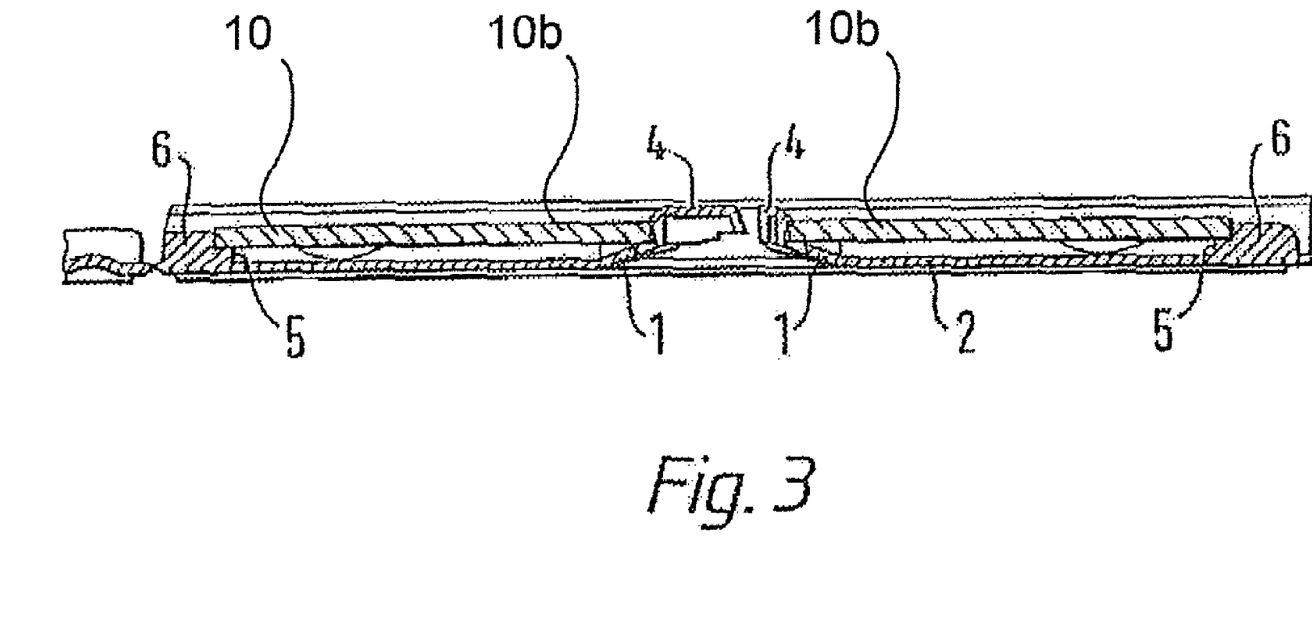
FIG. 3 is a side cross-sectional view through the apparatus of FIG. 2 with a disk shown held thereon.

FIG. 3 shows a cross-sectional view of the apparatus shown in FIG. 2 and shows a disk 10 held on the apparatus. This Figure shows the disk being held so that its periphery rests lightly on the supports 5 and the center of the disk 10 is supported clear of the base portion 2 by the arms 1, preferably 2-3 mm clear of the base portion 2.

The supports 5 also limit the extent by which the peripheral portion of the disk can be pressed towards the base portion. A further problem of the apparatus described in GB-A-2291640 is that by pressing the edge of the disk towards the base portion it is sometimes possible to prise the disk off the apparatus even though the button-like member has not been fully depressed. Accordingly, by limiting the scope for movement of the periphery of the disk towards the base portion, preferably in combination with an upstand (described further below) which limits the scope for lateral movement of the disk, this problem can be overcome or at least minimized.

The contact portions 4 may be mechanically interconnected, e.g. by a "living hinge" or a further button-like member. However, although this can be advantageous in some circumstances, it is not always possible or desirable. A living hinge can be formed between the contact portions if the apparatus is made of a resilient (typically crystalline) plastics material such as polypropylene and, indeed, this material is used to form apparatus as described herein when the apparatus is formed as an integral part of an enclosure for housing the disk. In some cases, such apparatus may, if desired, be provided with a mechanical interconnection between the contact portions, e.g. in the form of a living hinge, but in other cases no such interconnection is provided so the contact portions are separate from each other.

It is also desirable to form the apparatus described herein as an insert or "tray" for inserting within a separate casing. The conventional "jewel box" mentioned above comprises a clear plastics casing with the disk-holding rosette formed on a tray inserted therein. The apparatus described herein may also be formed on a similar type of tray for inserting in a conventional clear plastics casing. Such inserts or trays are preferably made of an amorphous plastics material, such as styrene, as this has the required rigidity to hold its shape when formed into a relatively flat, tray-like article and is capable of being formed into more precise and intricate shapes. However, it is not always possible to form a living hinge that will survive repeated use in such a rigid material.

Accordingly, the apparatus described herein may also be provided in the form of an insert or tray formed from an amorphous plastics material with the respective contact portions 4 separate from each other but together forming a button-like member suitable for engagement by a finger tip. Nevertheless, in some circumstances, it is possible to form living hinges between the contact portions of apparatus formed of an amorphous plastics material.

An advantage of using contact portions 4 which are not interconnected, is that any tendency for one portion to pull the other one down if one portion is subjected to a lateral force such as A or C described above, is also avoided.

In such an arrangement, the contact portions 4 are also preferably shaped so as to increase the likelihood that both portions are contacted when the button-like polypropylene and, indeed, this material is used to form apparatus as described herein when the apparatus is formed as an integral part of an enclosure for housing the disk. In some cases, between the contact portions, e.g. in the form of a living hinge, but in other cases no such interconnection is provided so the contact portions are separate from each other.

It is also desirable to form the apparatus described herein as an insert or "tray" for inserting within a separate casing. The conventional "jewel box" mentioned above comprises a clear plastics casing with the disk-holding rosette formed on a tray inserted therein. The apparatus described herein may also be formed on a similar type of tray for inserting in a conventional clear plastics casing. Such inserts or trays are preferable made of an amorphous plastics material, such as styrene, as this has the required rigidity to hold its shape when formed into a relatively flat, tray-like article and is capable of being formed in more precise and intricate shapes. However, it is not always possible to form a living hinge that will survive repeated use in such a rigid material.

Accordingly, the apparatus described herein may also be provided in the form of an insert or tray formed from an amorphous plastics material with the respective contact portions 4 separate from each other but together forming a button-like member suitable for engagement by a finger tip. Nevertheless, in some circumstances, it is possible to form living hinges between the contact portions of apparatus formed of an amorphous plastics material.

An advantage of using contact portions 4 which are not interconnected, is that any tendency for one portion to pull the other one down if one portion is subjected to a lateral force such as A or C described above, is also avoided.

In such arrangement, the contact portions 4 are also preferably shaped so as to increase the likelihood that both portions are contacted when the button-like member is depressed by a finger tip (as described above) to help ensure the release mechanism operates easily and reliably.

Another way of reducing the risk of accidental release of a disk due to forces applied in the plane of the disk, is to provide an upstand 6 surrounding or partially surrounding the disk when it is held in the apparatus so as to restrict access to the peripheral edge of the disk. The upstand 6 thus forms a "nest" in which the disk is held. The upstand 6 thus acts to obstruct access to much of the edge of the disk (except at finger cut-outs 6A which are provided to assist in lifting a disk out of the apparatus once it has been released) in order to further reduce the risk of forces being applied to the disk within the plane thereof. The upstand 6 is positioned close to the periphery of the disk (e.g. with a clearance of 0.5 mm or less) so as to provide further restriction on the scope for movement of the disk within its own plane.

Such an upstand may be used in apparatus having any form of release mechanism, e.g. any of the forms illustrated in FIGS. 1-4 or described below with reference to FIGS. 8-13. The support 5 described above may be formed as a step in the side of the upstand 6.

In the arrangement shown in FIG. 2, there is a gap in the upstand 6 at either side of the apparatus, each gap extending through about 40 degrees around the periphery of the disk. These gaps are provided to reduce the width of the apparatus. This is, for example, required so the apparatus made in the form of an insert or tray can be fitted into an enclosure of conventional size. The disk is clearly more vulnerable to lateral forces in the area of these gaps. However, it will be appreciated that by shaping the contact portions 4 so that the ends of the gap between the contact portions fall on a line which does not coincide with the gaps in the upstand 6, this potential problem can be avoided. These gaps may also be closed by the sides of the container or its lid when this is closed. As the upstand 6 surrounds the majority of the disk and is positioned close thereto, it is still effective in reducing the scope for movement of the disk within its own plane despite the presence of these gaps.

The apparatus described herein thus enables a disk to be securely held by simply placing the disk on the apparatus so that its aperture lies over the button-like member. The disk is then pressed towards the base portion 2 whereupon the button-like member is depressed causing the contact portions 4 and the projections 4A to move towards each other until the button-like member is able to pass through the aperture. Once the projections 4A have passed through the aperture, the arms 1 revert to or towards their unstressed position so that the projections 4A engage upon the outwardly facing surface of the disk and thus securely retain the disk on the apparatus.

The apparatus is designed so that the disk can be easily released by depressing the button-like member but is otherwise very difficult to remove other than by forcing it to the extent that the apparatus and/or the disk is damaged.

While held by the apparatus, the disk is supported away from the base portion 2 by the arms 1 and/or the button-like member. As the arms flex principally about the hinge lines 3 which are at a greater radius from the centre of the apparatus than the projections 4A, any attempt to prise or wrench the disk off the apparatus will cause the arms 1 to flex further from the base portion about the hinge lines 3 and thus tighten their engagement with the disk.

The arms 1 themselves are preferably relatively stiff so movement thereof occurs principally by means of flexing about the hinge lines 3 rather than flexing of the arm itself or of the contact portions 4 relative to the arm 1.

As indicated above, the disk is released by simply depressing the button-like member whereby the arms 1 flex towards the base portion 2. The disk itself must also be allowed to move towards the base portion 2 with the arms until the projections 4A have moved inwards sufficiently to release their engagement on the outwardly facing surface of the disk.

As described above, the shape of the contact portions 4 of the button-like member and/or the provision of an upstand immediately adjacent the edge of the disk help to reduce the risk of the disk being accidentally released by forces applied in the plane of the disk.

The apparatus shown in FIG. 2 is preferably formed as an integral, one-shot plastics molding.

Further improvements and features of the upstand 6 will now be described.

As indicated above, the apparatus is provided with an upstand 6 for surrounding or partially surrounding a disk held in the apparatus so as to restrict access to the peripheral edge of the disk. The upstand 6 thus acts to obstruct access to much of the edge of the disk, except at finger cut-outs 6A which are provided to assist in lifting a disk out of the apparatus when it has been released, to reduce the risk of forces being applied to the disk within the plane thereof. The upstand 6 is preferably positioned close to the periphery of the disk (e.g. with a clearance of 0.5 mm or less) so as to restrict the scope for movement of the disk within its own plane.

A potential problem with apparatus such as that shown in FIG. 2 is that users unfamiliar with the apparatus may be tempted to use the finger recesses 6A to try to grip the edge of the disk and attempt to wrench the disk off the button-like member without depressing the button-like member 4 and in doing so they are likely to damage the disk and/or the apparatus.

Figure 5:
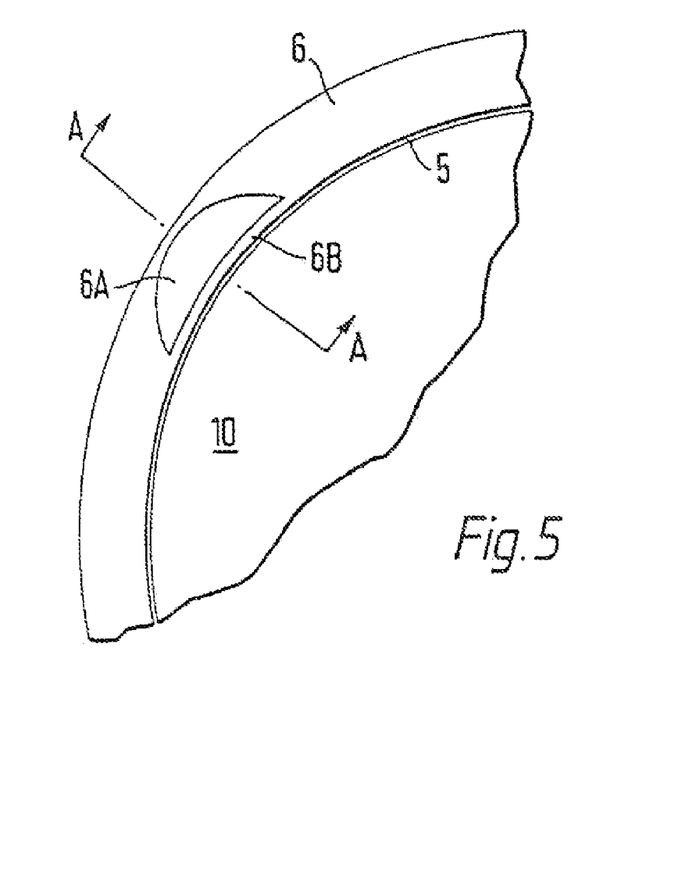
FIG. 5 is a schematic plan view of part of an apparatus such as that shown in FIG. 2, showing a modification thereof.

FIG. 5 is a schematic plan view of a finger recess 6A similar to those shown in FIG. 2 but which is formed such that when a disk 10 is held in the apparatus a part 6B of the upstand 6 extending across the finger recess 6A prevents or inhibits access to the edge of the disk 10 so that a user cannot use the finger recess to attempt to grip the disk by its edges.

Figure 6A:
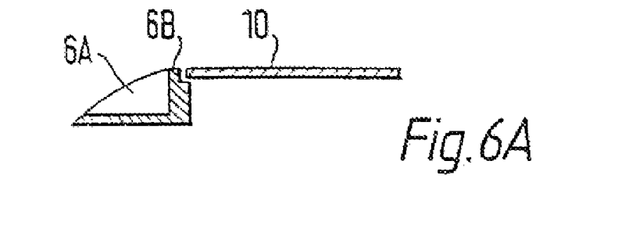
FIGS. 6A and 6B are sectional views taken along line A-A of FIG. 5.

FIG. 6A is a cross-sectional view of the finger recess 6A shown in FIG. 5 and shows the position of the disk when it is held by the disk-engaging means. As shown, the disk is preferably held just clear of the step or support 5 provided on the inner side of the upstand 6 but is at a position level with or beneath the top of the part 6B. The upstand 6, and the parts 6B thereof across the recesses 6A, thus prevent access to the edge of the disk.

Figure 6B:
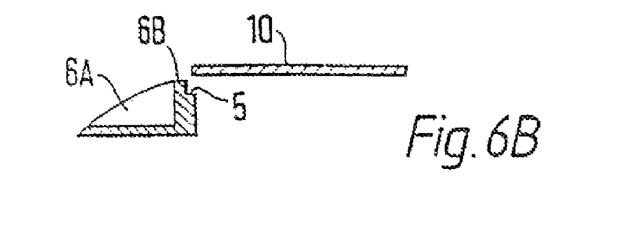

However, after the disk has been released from the disk-engaging means by depression of the button-like member 4, an ejection mechanism (as described above) causes the disk to be lifted so it is supported on or slightly above the button-like member 4 so that the periphery of the disk stands proud of the upstanding portion 6B as shown in FIG. 6B. The user can then make use of the finger recesses 6A to grip the edge of the disk 10 in order to lift it from the apparatus.

It will be appreciated that, compared to the arrangement shown in FIG. 2, the finger recesses shown in FIG. 5 are modified so that they do not extend through to the inner side of the upstand 6 so the upstand 6 is not interrupted by the recesses. This is achieved by providing a relatively thin wall or upstand 6B across the inner end of each finger recess 6A as shown in FIG. 5.

Figure 7:
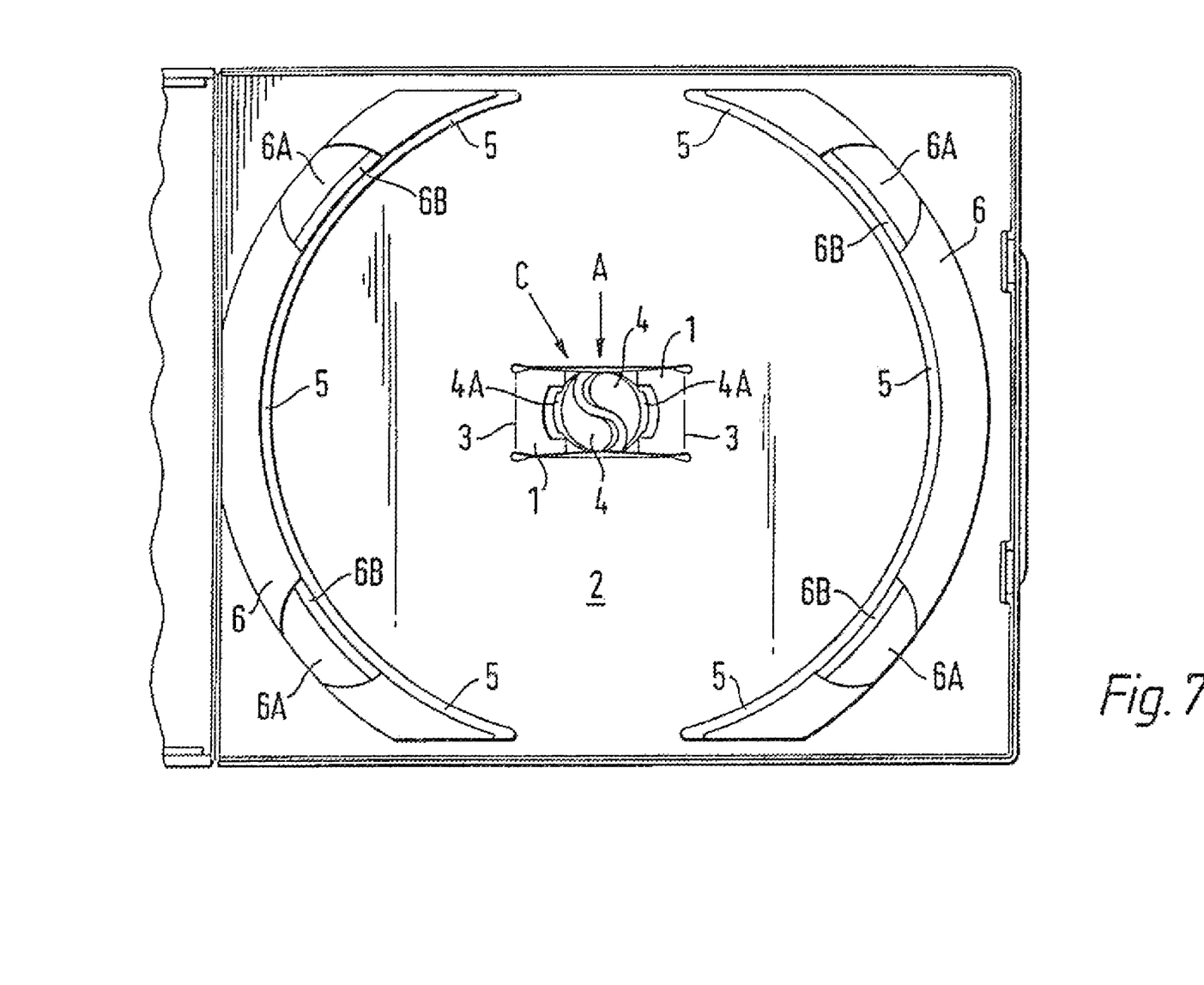
FIG. 7 is a plan view of an apparatus similar to that shown in FIG. 2 but with the modification illustrated in FIG. 5.

FIG. 7 is a plan view of apparatus similar to that shown in FIG. 2 but with the addition of walls 6B across the inner ends of the finger recesses 6A to prevent access to the periphery of the disk until the disk is lifted clear of the walls 6B following release of the disk-engaging means.

As described above, to enable the disk 10 to be lifted from the apparatus it must be moved to a raised position following its release so that it stands proud of the part 6B of the upstand 6. It is found that access to the edge of the disk is sufficient to enable it to be lifted, it not being necessary for the user's fingers to engage the underside of the disk. Thus, to enable the disk to be lifted away from the apparatus it is merely necessary for the disk to be moved, following its release from the disk-engaging means, to a position where it stands just clear of the top of parts 6B of the upstand 6, preferably with the underside of the disk 10 just clear of the top of parts 6B.

The top of the parts 6B of the upstand may be at the same level as the top of the remainder of the upstand 6 or may be at a slightly lower position than the top of the remainder of the upstand 6.

When the disk 18 is held by the disk-engaging means, the upper surface of the disk 10 preferably lies at substantially the same level as the top of the parts 6B or may lie slightly below the level of the top of the remainder of the upstand 6 to prevent access to the edge of the disk 10. However, in other arrangements, when the disk 10 is held by the disk-engaging means, its upper surface may lie at a higher level than the top of the parts 6B as the form of the upstand 6 and/or recesses 6A may be such as to prevent a user's finger from being able to grip the edge of the disk as only the upper corner at the periphery of the disk can be touched. However, following release of the disk 10, it is lifted so the bottom surface of the disk 10 lies at a similar level to or above the level of the top of the parts 6B so the edge of the disk, 10 can be gripped by a user's fingers.

Figure 8:
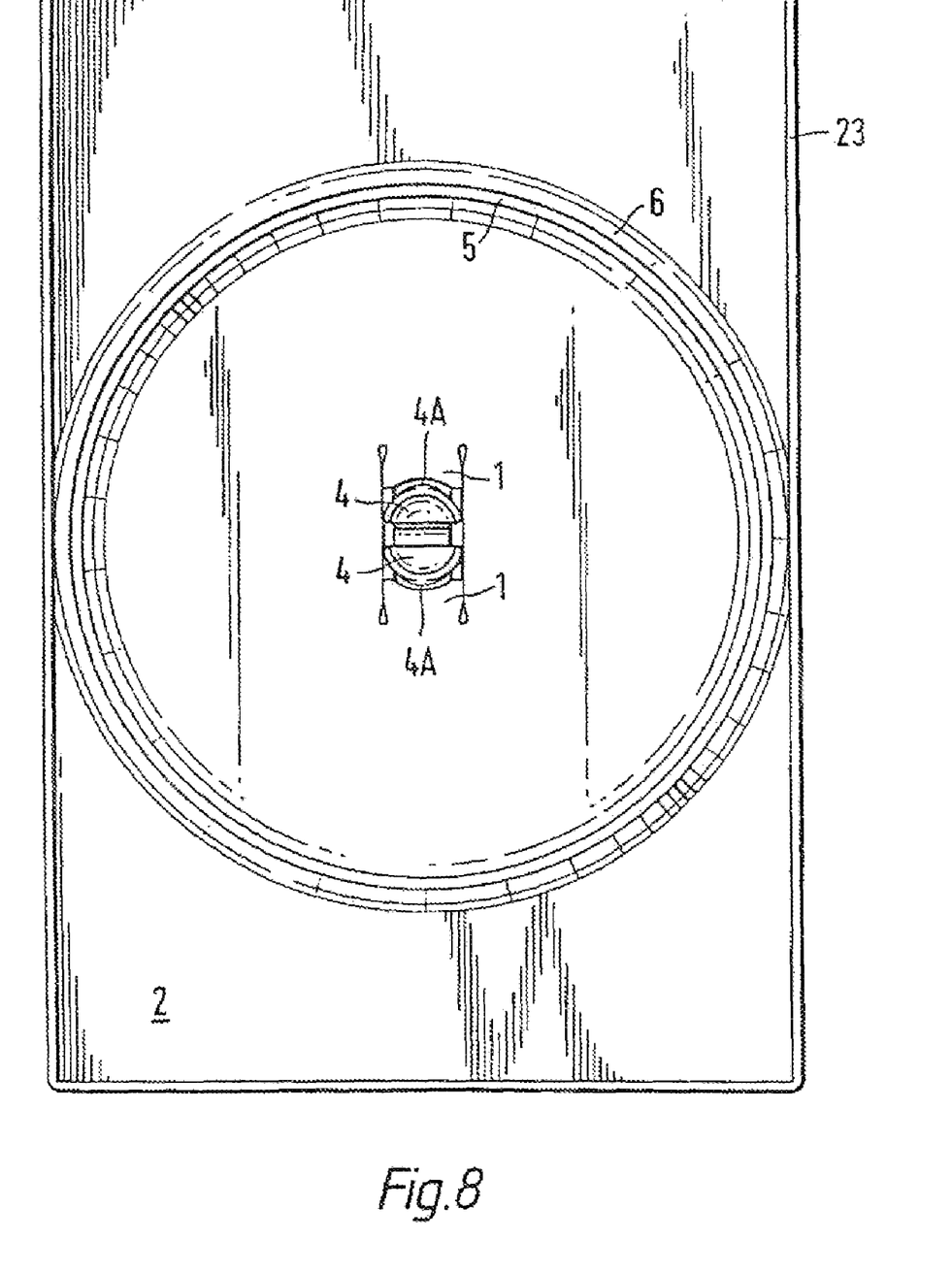
FIG. 8 is a plan view of another embodiment of an apparatus according to the present invention.
Figure 9:
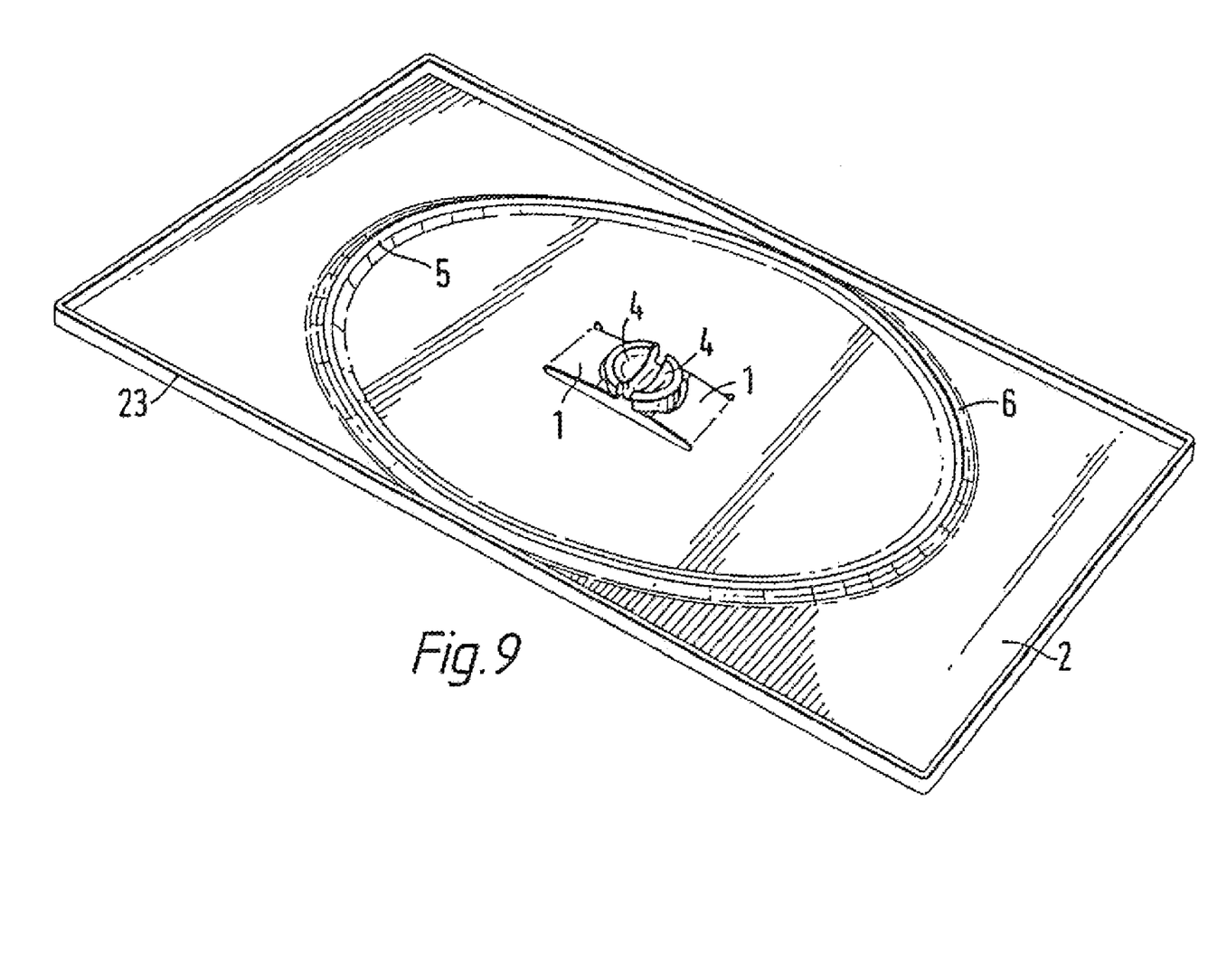
FIG. 9 is a perspective view of the apparatus shown in FIG. 8.

FIGS. 8 and 9 show a further embodiment of apparatus for holding a compact disk. This embodiment is designed for holding a digital video disc (DVD) and the base portion 2 thus has a shape and size similar to that of a conventional video box.

The disk release mechanism illustrated in FIGS. 8 and 9 is similar to that described in GB-A-2291640 and WO96/14636. The two halves of the button-like member may be joined by a living hinge as shown or may be unconnected.

The upstand 6 shown in FIGS. 8 and 9 is similar to that of FIG. 2 except that it is continuous, i.e. it extends the full 360 degrees around the periphery of the disk and, in the arrangement shown, no finger recesses are provided.

A support 5 is provided in the form of a step on the inner edge of the upstand 6 as in FIG. 2 except this is also continuous, i.e. extends the full 360 degrees around the periphery of the disk.

The apparatus shown in FIGS. 8 and 9 functions in a manner similar to that shown in FIG. 2. When a disk is held on the apparatus, the upstand, being positioned immediately adjacent the periphery of the disk, obstructs access to the edge of the disk to prevent forces being applied to the disk in the plane thereof and to inhibit finger access to the edge of the disk and also serves to restrict scope for movement of the disk within the plane of the disk. It is therefore very difficult for the disk to be released from the mechanism either accidentally or intentionally other than by depressing the button-like member 4 at the center of the disk.

When the button-like member 4 is depressed, the center 10b of the disk 10 is flexed downwards by the action of the projections 4A of the button-like member 4 as the periphery of the disk 10 is supported on the support 5 until the engagement of the projections 4A on the disk 10 are released and the button-like member is able to pass through the central hole of the disk 10. The center 10b of the disk 10 then "pops up" as the disk 10 reverts to its flat, unflexed state whereby the center 10b of the disk 10 is raised to prevent it being re-engaged by the button-like member when the user's finger is removed therefrom. The disk 10 then rests lightly on the top of the button-like member 4 and its projections 4A and in this position its edges are held clear of the upstand 6 so a user's fingers can engage the edges of the disk 10 to lift it away from the apparatus.

Figure 10:
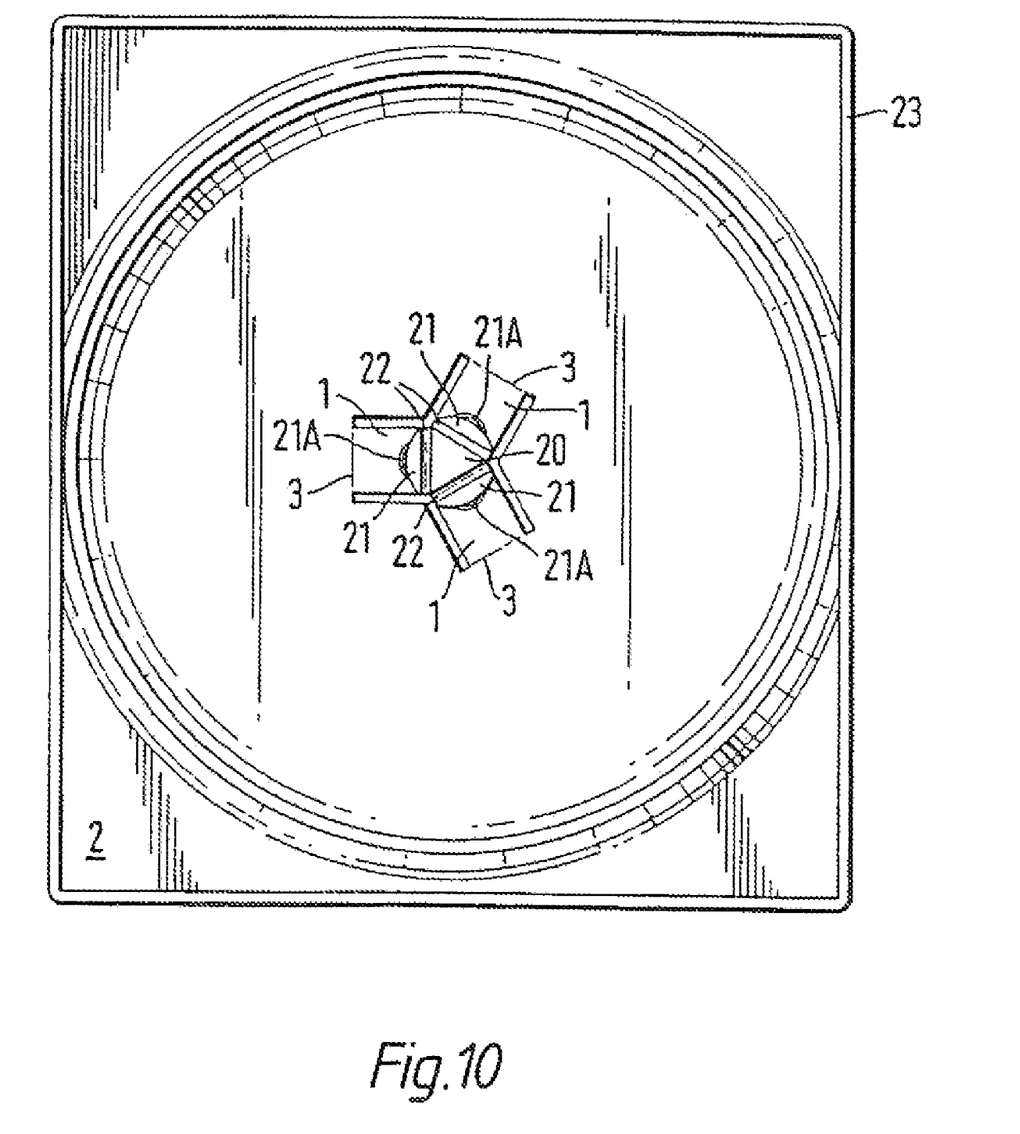
FIG. 10 is a plan view of a further embodiment of an apparatus according to the present invention.
Figure 11:
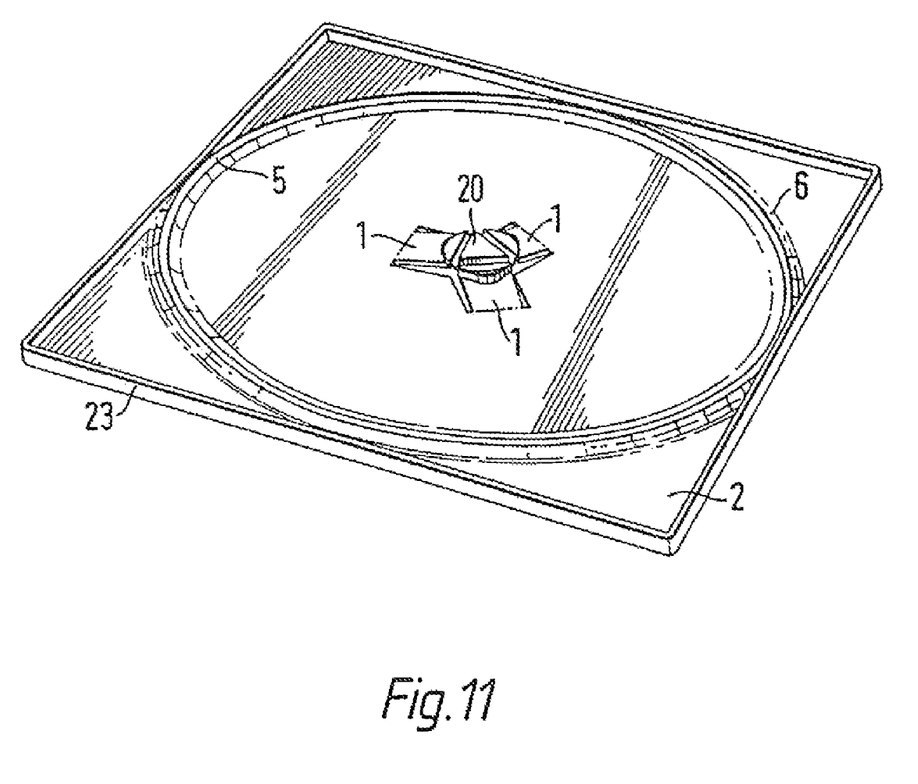
FIG. 11 is a perspective view of the apparatus shown in FIG. 10.

FIGS. 10 and 11 show another embodiment of apparatus for holding a compact disk similar to that shown in FIGS. 8 and 9 but with a 3-arm release mechanism instead of a 2-arm release mechanism, and mounted on a substantially square base portion 2 rather than a rectangular base portion. As shown, the three arms 1 are equiangularly spaced from each other.

Each of the three arms 1 is cantilevered from the base portion 2 and connected thereto at a hinge line 3. The inner ends of the three arms 1 together form a button-like member comprising a triangular portion 20 each side of which is connected to a segment-shaped portion 21 by a living hinge 22. The three segment-shaped portions 21 together form a substantially complete circular shape over which the central hole of a disk 10 can be fitted. A lip or projection 21A for engaging on the outwardly facing surface of the disk 10 projects from the curved side of each segment-shaped portion 21. The lips 21A preferably project 0.5-1.0 mm from the portions 21.

Depression of the triangular portion 20 towards the base portion 2 causes the three segment-shaped portions 21 to move towards each other, i.e. towards the centre of the triangular portion 20, until the projections 4A are moved out of engagement with the outwardly facing surface of the disk 10 so as to release their engagement with the disk. In all other respects, this apparatus functions in a similar manner to that shown in FIGS. 8 and 9.

The base portions 2 shown in FIGS. 8-11 may form part of a casing or may form a tray for insertion into a casing. In a further arrangement, the base portion 2 may be affixed, e.g. by adhesive, to one half of a folded cover (not shown) e.g. formed of cardboard, the other half being arranged, when folded over, to cover a disk held on the apparatus.

For the latter arrangement, the rear side of the base portion 2 is preferably substantially flat so as to facilitate its adhesion to the folded cover. The rear sides of the base portions shown in FIGS. 8-11 may be formed flat apart from a circular recess corresponding to the circular upstand 6 and a central cut-out where the release mechanism is formed.

A further upstand in the form of a wall 23 is provided around the periphery of the base portion 2. The wall 23 is preferably slightly higher than the upstand 6, so when the folded cover mentioned above is closed, the cover does not lie in contact with the disk. As shown in FIG. 10, the wall 23 may form part of the upstand 6 where the upstand 6 meets the wall at the edge of the base portion.

Figure 12:
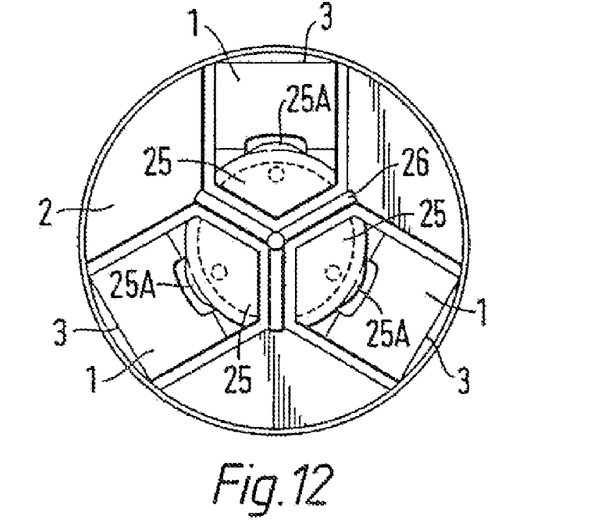
FIG. 12 is a plan view of an alternative form of release mechanism which may be used in the apparatus shown in any of the preceding Figures.

FIG. 12 is a plan view of another version of a 3-arm release mechanism which may be used in any of the other embodiments described above. In this case, the inner ends of the arms 1 are each provided with a sector-shaped portion 25 which together form a circular button-like member. The three sector-shaped portions 25 are separate from each other, i.e. they are not connected by living hinges. Each of the sector-shaped portions 25 has a projection 25A for engaging a disk.

Figure 13A:
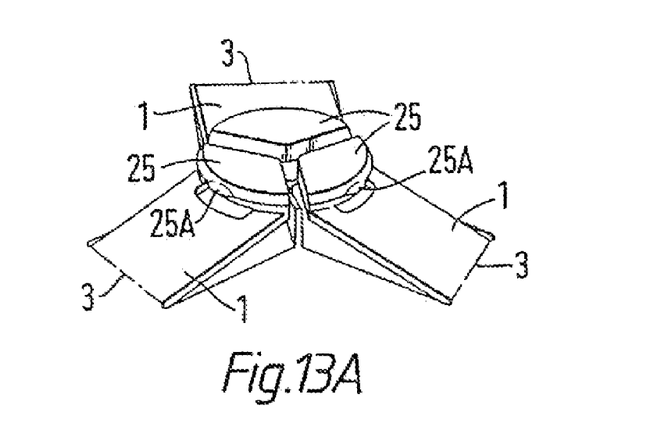
FIG. 13A is a perspective view of the release mechanism of FIG. 12.
Figure 13B:
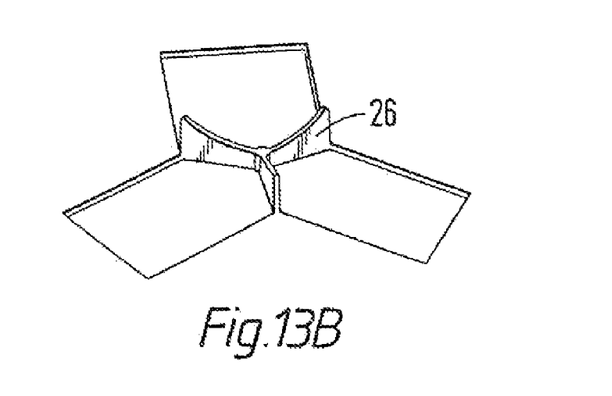
FIG. 13B is a perspective view of the release mechanism of FIG. 12, with some parts omitted so as to reveal other parts of the alternative form of release mechanism that are concealed in FIG. 13A.

FIG. 13A is a perspective view of the 3-arm release mechanism shown in FIG. 12. FIG. 13B is a similar view but with the arms 1 and sector-shaped portions 25 omitted so as to more clearly show a three-armed reinforcing portion 26 provided across the cutout in the base portion 2 underneath the release mechanism.

The apparatus shown in FIGS. 10 and 11 is suitable for making in a resilient crystalline plastics material and the apparatus shown in FIGS. 12 and 13 is suitable for making in an amorphous plastics material.

In each of the embodiments described in relation to FIGS. 8-11, the upstand 6 is again preferably positioned so as to be immediately adjacent the edge of a disk held on the apparatus so as to prevent movement of the disk in its own plane and to provide the other functions described above.

FIGS. 8-11 show a continuous upstand 6 without finger recesses. However, in other arrangements (not shown) some areas of the upstand may be of slightly reduced height to facilitate finger access to the edge of the disk once it has been released so making it easier to grip the disk to lift it clear of the apparatus. Four localized areas of reduced height may, for instance, be provided in the upstand, each extending over a length of upstand subtending an angle of about 20 degrees at the centre of the apparatus. These areas are preferably equiangularly spaced from each other and preferably located in areas of the upstand nearest the corners of the base portion 2.

In the apparatus described in relation to FIGS. 8-11, the support 5 preferably comprises a raised surface substantially parallel to the base portion (and to the plane of a disk held thereon). The raised surface may, for instance, be at a level 2-3 mm above the base portion 2 and have a width of about 2 mm. The upstand 6 extends about 0.5 to 1.5 mm, and preferably about 1 mm, above the raised surface 5 (a compact disk typically has a thickness of about 1 mm).

It should be noted that the degree of flexing of a disk required to cause the center of the disk to rise or "pop up" sufficiently on release of the disk to prevent re-engagement thereof by the disk engaging mechanism may be relatively small. In some embodiments with a typical disk having a diameter of approximately 120 mm the center may be flexed approximately 0.5-1.0 mm relative to the periphery thereof whereas in other embodiments the center may flex 1.0-3.0 mm. Similarly, the periphery of the disk need be raised by only a relatively small amount to lift it sufficiently relative to the upstand to enable the edges of the disk to be grasped. In some embodiments, this movement may be as small as 0.5-1.0 mm whereas in other embodiments it may be 1-5 mm.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. Apparatus for holding a compact disk having a central hole, the apparatus comprising:
   a base portion provided with disk engaging and release means for releasably engaging the central hole of a disk;

ejection means for moving the disk to a raised position relative to the base portion following its release from the disk engaging means;

an upstand for at least partially surrounding the periphery of a disk held on the apparatus, the upstand being positioned and shaped to allow access to an outer edge of the disk when it has been moved to the raised position following release from the disk engaging means to permit removal of the disk from the apparatus but at least restrict such access when the disk is held by the disk engaging means, the upstand including a plurality of finger recesses to facilitate removal of a disk from the up stand; and a support structure radially inside the upstand having a raised surface substantially parallel to the base portion for supporting an outer edge of a disk and preventing the outer edge of the disk being pressed against the base portion, wherein a portion of the support structure extends across each of the finger recesses radially adjacent thereto.

2. A disk holder for use in holding a disk having a central hole, the disk holder comprising:

a base portion;

disk-engaging structure extending from said base portion for releasably engaging the disk via its central hole; and disk support structure having a raised surface substantially parallel to the base portion for supporting the disk away from its central hole;

wherein at least a portion of the disk adjacent its central hole may be flexed until release of the disk-engaging structure from the disk, the resilience of the disk itself then causing disengagement of the disk from said disk-engaging structure;

wherein said disk-engaging structure supports the disk adjacent its central hole away from said base portion of the disk holder; and wherein the base portion is configured to flex during depression of the disk-engaging structure along with the portion of the disk adjacent its central hole until release of the disk-engaging structure from the disk, such that the flexing of the disk and the base portion releases the disk from engagement with said disk-engaging structure.

3. Apparatus for holding a compact disk having a central hole, the apparatus comprising:

a base portion provided with disk engaging and release means for releasably engaging the central hole of a disk;

an upstand for at least partially surrounding the periphery of a disk held on the apparatus, the upstand being positioned and shaped to allow access to an outer edge of the disk when the disk has been released from the disk engaging and release means to permit removal of the disk from the apparatus; and a support structure radially inward from the upstand configured and adapted to support the outer edge of a disk and preventing the outer edge of the disk being pressed against the base portion, wherein, when the disk is engaged with said disk engaging and release means, the support structure is configured to secure the disk against being released solely by pressing the outer edge of the disk toward the base portion, and wherein the disk engaging and release means are configured and adapted such that when pressure is applied to said disk engaging and release means the center of the disk is depressed relative to the support structure towards said base portion thereby disengaging the disk from the disk engaging and release means.

4. An apparatus as recited in claim 1, wherein the support structure is continuous around the disk engaging means for 360 degrees.

5. An apparatus as recited in claim 2, wherein the disk support structure is configured and adapted to flex when the portion of the disk adjacent its central hole is flexed, such that flexing of the disk support structure contributes to the flexing of the disk and of the base portion to pop the disk out of engagement with the disk-engaging structure.

6. Apparatus for holding a compact disk having a central hole, the apparatus comprising:

a base portion provided with disk engaging and release means for releasably engaging the central hole of a disk;

ejection means for moving the disk to a raised position relative to the base portion following its release from the disk engaging means;

an upstand for at least partially surrounding the periphery of a disk held on the apparatus, the upstand being positioned and shaped to allow access to an outer edge of the disk when it has been moved to the raised position following release from the disk engaging means to permit removal of the disk from the apparatus but at least restrict such access when the disk is held by the disk engaging means, the upstand including a plurality of finger recesses to facilitate removal of a disk from the upstand; and a support structure radially inside the upstand having a raised surface substantially parallel to the base portion for supporting an outer edge of a disk and preventing the outer edge of the disk being pressed against the base portion, wherein the support structure is continuous around the disk engaging means for 360 degrees.

* * * * *